US008406980B2

(12) United States Patent
Nakagawa et al.

(10) Patent No.: US 8,406,980 B2
(45) Date of Patent: Mar. 26, 2013

(54) AIR-FUEL RATIO CONTROL DEVICE AND AIR-FUEL RATIO CONTROL METHOD FOR INTERNAL COMBUSTION ENGINE

(75) Inventors: Norihisa Nakagawa, Numazu (JP); Takahiko Fujiwara, Susono (JP); Taiga Hagimoto, Susono (JP); Junichi Kako, Susono (JP); Naoto Kato, Susono (JP); Shuntaro Okazaki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 834 days.

(21) Appl. No.: 12/595,767

(22) PCT Filed: Apr. 11, 2008

(86) PCT No.: PCT/IB2008/000881
§ 371 (c)(1),
(2), (4) Date: Oct. 13, 2009

(87) PCT Pub. No.: WO2008/125952
PCT Pub. Date: Oct. 23, 2008

(65) Prior Publication Data

US 2010/0108046 A1 May 6, 2010

(30) Foreign Application Priority Data

Apr. 13, 2007 (JP) ................................ 2007-105962

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |
| ***F01N 3/00*** | (2006.01) |
| ***F02D 41/00*** | (2006.01) |

(52) U.S. Cl. .......................... 701/103; 60/276; 123/672

(58) Field of Classification Search .................... 60/277, 60/285, 276; 123/672, 674; 701/60, 103
See application file for complete search history.

(56) References Cited

U.S. PATENT DOCUMENTS 5,115,639 A * 5/1992 Gopp ............................ 60/274

(Continued)

FOREIGN PATENT DOCUMENTS

| | | |
|---|---|---|
| EP | 1 469 182 | 10/2004 |
| JP | 2004-332714 | 11/2004 |
| JP | 2005 61356 | 3/2005 |

(Continued)

*Primary Examiner* — Stephen K Cronin
*Assistant Examiner* — Sizo Vilakazi
(74) *Attorney, Agent, or Firm* — Oblon, Spivak, McClelland, Maier & Neustadt, L.L.P.

(57) ABSTRACT

An air-fuel ratio control device includes an air-fuel ratio sensor provided upstream from a three-way catalyst, and an oxygen sensor provided downstream from the three-way catalyst. The air-fuel ratio control device controls the fuel supply amount based on the output from the air-fuel ratio sensor, and compensates for errors in the air-fuel ratio sensor by correcting the fuel supply amount based on the output from the oxygen sensor. The fuel supply correction amount is calculated based on an integral term that integrates the deviation between the output from the downstream air-fuel ratio sensor and the target air-fuel ratio. When a fuel supply adjustment control is executed, the value of the integral term in the sub-feedback control is not updated for a predetermined period after the fuel supply adjustment control ends. The actual air-fuel ratio is thus brought to the target air-fuel ratio in an appropriate manner.

6 Claims, 7 Drawing Sheets

U.S. PATENT DOCUMENTS

| | | | | | |
|---|---|---|---|---|---|
| 5,832,724 | A * | 11/1998 | Watanabe et al. | 60/276 |
| 6,018,945 | A * | 2/2000 | Nakagawa | 60/285 |
| 6,502,389 | B2 * | 1/2003 | Katayama et al. | 60/285 |
| 6,668,813 | B2 * | 12/2003 | Azuma et al. | 123/687 |
| 2004/0209734 | A1 * | 10/2004 | Mitsutani | 477/111 |
| 2005/0022510 | A1 * | 2/2005 | Nakagawa et al. | 60/285 |

FOREIGN PATENT DOCUMENTS

| | | |
|---|---|---|
| JP | 2005 105834 | 4/2005 |
| JP | 2006-63949 | 3/2006 |
| JP | 2006-104978 | 4/2006 |
| JP | 2006-170098 | 6/2006 |

* cited by examiner

AIR-FUEL RATIO CONTROL DEVICE AND AIR-FUEL RATIO CONTROL METHOD FOR INTERNAL COMBUSTION ENGINE

BACKGROUND OF THE INVENTION

1. Field of the Invention

The present invention relates to an air-fuel ratio control device and an air-fuel ratio control method for an internal combustion engine.

2. Description of the Related Art

Exhaust gas discharged from an internal combustion engine contains components such as hydrocarbons (HC), carbon monoxide (CO), and nitrogen oxides (NOx). A three-way catalyst is used to convert these components to less toxic substances. The performance of such a three-way catalyst increases when the air-fuel ratio of the exhaust gas (hereinafter, referred to as "exhaust air-fuel ratio") is substantially stoichiometric. Thus, to purify exhaust gas using a three-way catalyst, the amount of fuel supplied to the combustion chamber is controlled so that the exhaust air-fuel ratio is substantially stoichiometric.

To this end, in most internal combustion engines, an air-fuel ratio sensor that detects the exhaust air-fuel ratio is provided in an engine exhaust passage upstream from the three-way catalyst. Feedback (F/B) control is performed to control the amount of fuel supplied to the combustion chamber so that the exhaust air-fuel ratio detected by the air-fuel ratio sensor is substantially theoretical.

However, on the upstream side of the three-way catalyst, the output of the air-fuel ratio sensor may become unstable due to insufficient mixing of exhaust gas, or the air-fuel ratio sensor may degrade due to the heat of exhaust gas, making it impossible for the air-fuel ratio sensor to accurately detect the actual air-fuel ratio. In these cases, the accuracy of air-fuel ratio control based on the above-described feedback control deteriorates.

In view this, a so-called "double sensor system" has already been put into practical use. In the double sensor system, a second air-fuel ratio sensor is provided in the engine exhaust passage downstream from the three-way catalyst. The double sensor system improves the accuracy of air-fuel ratio control by performing a sub-feedback control, which corrects the output value of the upstream air-fuel ratio sensor (and consequently the amount of fuel supplied) based on the output of the downstream air-fuel ratio sensor so that the output value of the upstream air-fuel ratio sensor matches the actual exhaust air-fuel ratio.

In this double sensor system, a learned value corresponding to a steady-state error between the output value of the upstream air-fuel ratio sensor and the actual exhaust air-fuel ratio is calculated based on a correction amount in the sub-feedback control, and a learning control is performed to correct the output value of the upstream air-fuel ratio sensor based on the calculated learned value. Because the learned value is stored in the RAM of the ECU also during stoppage of the engine, for example, even when the output of the upstream air-fuel ratio sensor has not been sufficiently corrected by the sub-feedback control after restarting the internal combustion engine, the output value is appropriately corrected by the learned value. It is thus possible to prevent deterioration in the accuracy of air-fuel ratio control and therefore deterioration of exhaust emissions.

After the execution of a fuel increase or decrease control in which the amount of fuel supplied is increased or decreased irrespective of the target air-fuel ratio during operation of the engine (for example, a fuel cut-off control or fuel increase control at engine start-up), excess oxygen or excess fuel may accumulate in the exhaust purification catalyst. In this case, for example, there is a large difference between the air-fuel ratio of exhaust gas discharged from the combustion chamber and the air-fuel ratio of exhaust gas flowing out from the exhaust purification catalyst. Executing the above-mentioned main feedback control, sub-feedback control, learning control, or the like in this state makes it impossible to control the air-fuel ratio in an appropriate manner.

Accordingly, it has been proposed to prohibit learning control for a fixed period of time after completion of the fuel cut-off control (see Japanese Patent Application Publication No. 2005-105834 (JP-A-2005-105834)). This prevents the learned value from being updated when there is a large difference between the air-fuel ratio of exhaust gas discharged from the combustion chamber and the air-fuel ratio of exhaust gas flowing out from the exhaust purification catalyst, that is, when the output of the downstream air-fuel ratio sensor is inappropriate. As a result, inappropriate control of the air-fuel ratio is restrained.

As described above, in the sub-feedback control, proportional-integral-derivative (PID) control or proportional-integral (PI) control is performed in order to correct the output value of the upstream air-fuel ratio sensor (and hence the fuel supply amount) based on the output of the downstream air-fuel ratio sensor so that the output value of the upstream air-fuel ratio sensor matches the actual exhaust air-fuel ratio. In the above-mentioned learning control, the learned value is changed based on the value of the integral term used in the integral control in the sub-feedback control. Generally, the larger the value of the integral term, the larger the amount of change in learned value.

On the other hand, as described above, the air-fuel ratio of exhaust gas detected by the downstream air-fuel ratio sensor over a fixed period after the end of fuel cut-off control differs from the air-fuel ratio of exhaust gas discharged from the combustion chamber. In this regard, in the device described in JP-A-2005-105834, although the learning control is prohibited for a fixed period after a fuel cut-off control ends, integral control in the sub-feedback control is not prohibited. Thus; as for the value of the integral term in the sub-feedback control, integration is performed within the fixed period of time based on an air-fuel ratio that deviates from the air-fuel ratio of exhaust gas discharged from the combustion chamber. Therefore, the error in the value of the integral term becomes extremely large by the time this fixed period ends. This means that upon resuming learning control after the end of the fixed period, a learned value is calculated based on the value of the integral term with an extremely large error, making the resulting learned value inappropriate. As a result, exhaust emissions deteriorate.

SUMMARY OF THE INVENTION

The present invention provides an air-fuel ratio control device and an air-fuel ratio control method which make it possible to bring the actual air-fuel ratio to a target air-fuel ratio in an appropriate manner even after the execution of fuel increase or decrease control.

A first aspect of the present invention relates to an air-fuel ratio control device for an internal combustion engine that includes: an upstream air-fuel ratio sensor that is provided upstream from an exhaust purification catalyst provided in an engine exhaust passage and detects the air-fuel ratio of the exhaust gas; and a downstream air-fuel ratio sensor that is provided downstream from the exhaust purification catalyst and detects the air-fuel ratio of the exhaust gas. The air-fuel ratio control device executes a main feedback control to control the fuel supply amount based on an output value of the upstream air-fuel ratio sensor so that the exhaust air-fuel ratio reaches a target air-fuel ratio. The air-fuel ratio control device also executes a sub-feedback control that compensates for deviations between the output value of the upstream air-fuel ratio sensor and the actual exhaust air-fuel ratio by correcting the fuel supply amount based on the output value of the downstream air-fuel ratio sensor so that the exhaust air-fuel ratio reaches the target air-fuel ratio. The correction amount for the fuel supply amount in the sub-feedback control is calculated based on the value of an integral term that integrates the deviation between the output value of the downstream air-fuel ratio sensor and the target air-fuel ratio, and when a fuel increase or decrease control that increases or decreases the fuel supply amount irrespective of the target air-fuel ratio is executed, updating of the integral term in the sub-feedback control is suspended for a predetermined period after the fuel increase or decrease control is completed. According to the first aspect, integration of the integral term in the sub-feedback control is suspended for a predetermined period after the fuel increase or decrease control is completed. This prevents integration of the integral term based on an air-fuel ratio that differs from the air-fuel ratio of exhaust gas discharged from the combustion chamber within the above-mentioned predetermined period, thus preventing an error in the value of the integral term from becoming extremely large. Therefore, when, for example, the learning control is executed, it is less likely that the learned value will be calculated based on an integral term with an extremely large error, thus preventing the learned value from taking an inappropriate value.

The air-fuel ratio control device may further include a learning means for calculating a learned value, which corresponds to a steady-state error between the output value of the upstream air-fuel ratio sensor and the actual exhaust air-fuel ratio, based on the value of the integral term, and correcting the fuel supply amount based on the calculated learned value.

In addition, the learning means may continue to calculate the learned value even during the predetermined period the fuel increase or decrease control is completed.

The correction, amount for the fuel supply amount in the sub-feedback control may be calculated based on a value of a proportional term obtained by multiplying the deviation between the output value of the downstream air-fuel ratio sensor and the target air-fuel ratio by a proportional gain, in addition to the value of the integral term, and the value of the proportional term may be made larger during the predetermined period after the fuel increase or decrease control is completed than in a period other than the predetermined period.

Further, the predetermined period run from when the fuel increase or decrease control is completed until the air-fuel ratio of exhaust gas discharged from the exhaust purification catalyst is close to the target air-fuel ratio.

According to the first aspect, the learned value is prevented from taking an inappropriate value even after execution of the fuel increase or decrease control, thereby making it possible to bring the actual air-fuel ratio to a target air-fuel ratio in an appropriate manner.

A second aspect of the present invention relates to an air-fuel ratio control method for an internal combustion engine that includes: an upstream air-fuel ratio sensor that is arranged on an exhaust upstream side of an exhaust purification catalyst provided within an engine exhaust passage and detects an air-fuel ratio of exhaust gas; and a downstream air-fuel ratio sensor is arranged on an exhaust downstream side of the exhaust purification catalyst and detects an air-fuel ratio of exhaust gas, the air-fuel ratio control method including: executing a main feedback control that controls a fuel supply amount based on an output value of the upstream air-fuel ratio sensor so that an exhaust air-fuel ratio becomes a target air-fuel ratio; and executing a sub-feedback control that compensates for an error between the output value of the upstream air-fuel ratio sensor and an actual exhaust air-fuel ratio by correcting the fuel supply amount based on an output value of the downstream air-fuel ratio sensor so that the exhaust air-fuel ratio becomes the target air-fuel ratio. A correction amount for the fuel supply amount is calculated based on a value of an integral term that integrates a deviation between the output value of the downstream air-fuel ratio sensor and the target air-fuel ratio, and when a fuel increase or decrease control that increases or decreases the fuel supply amount irrespective of the target air-fuel ratio is executed, updating of the value of the integral term in the sub-feedback control is stopped for a predetermined period after completion of the fuel increase or decrease control. According to the second aspect, integration of the value of the integral term in the sub-feedback control is stopped for a predetermined period after the completion of the fuel increase or decrease control. This prevents integration from being performed based on an air-fuel ratio that differs from the air-fuel ratio of exhaust gas discharged from the combustion chamber within the above-mentioned predetermined period, thus preventing an error in the value of the integral term from becoming extremely large. Therefore, when, for example, the learning control is executed, it is less likely that the learned value will be calculated based on an integral term with an extremely large error, thus preventing the learned value from taking an inappropriate value.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF THE PREFERRED EMBODIMENTS

Figure 1:
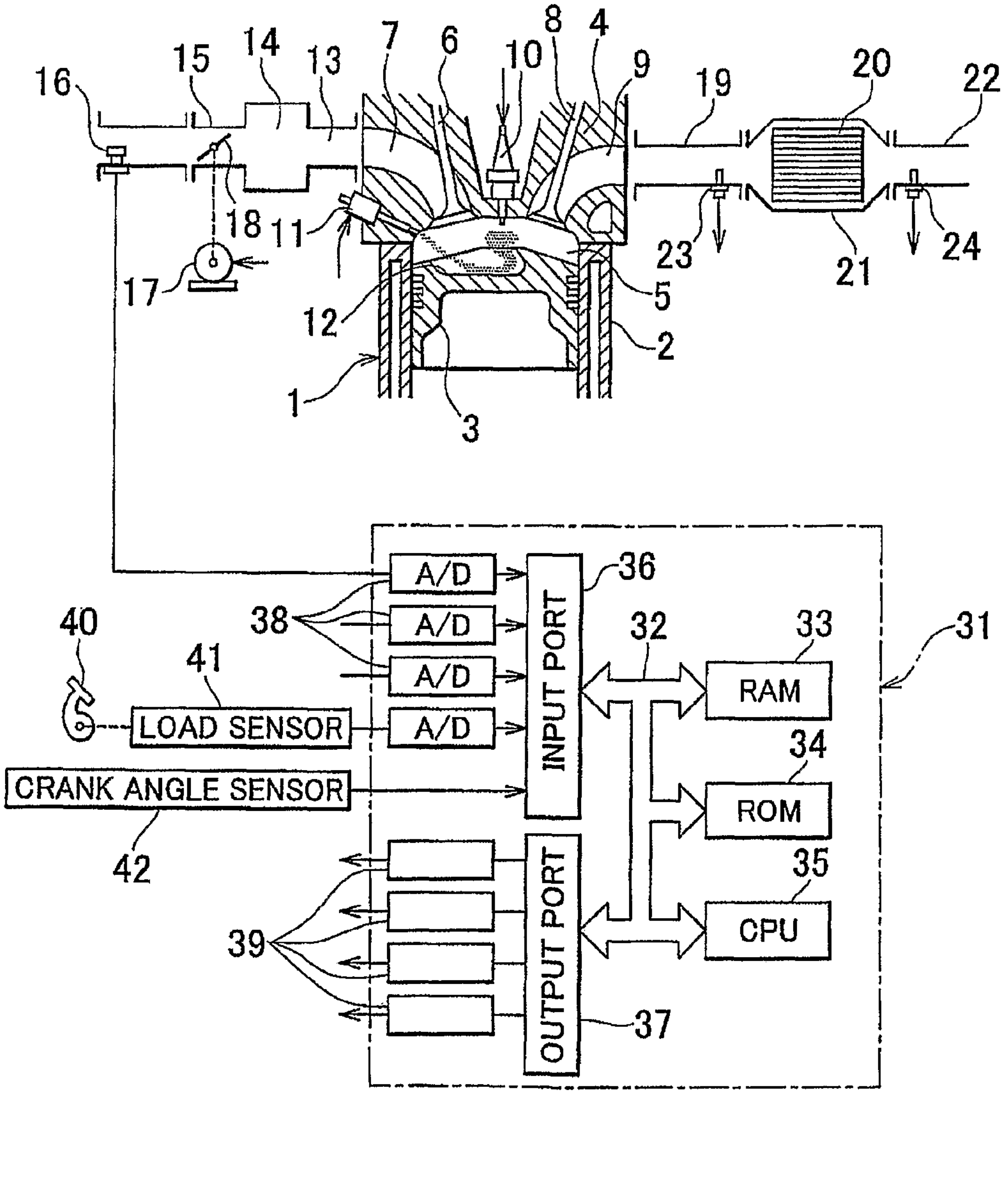
FIG. 1 is a diagram showing the entire internal combustion engine to which an air-fuel ratio control device according to the present invention is applied.

An air-fuel ratio control device for an internal combustion engine according to the present invention will be described below with reference to the drawings. FIG. 1 is a diagram of the entire internal combustion engine in which the control device according to the present invention is mounted. While FIG. 1 shows an embodiment of the air-fuel ratio control device according to the present invention as applied to an in-cylinder direct-injection spark ignited internal combustion engine, the present invention can be also applied to other types of spark ignited internal combustion engine, a compression self-ignited internal combustion engine, and the like.

FIG. 1 shows an engine 1, a cylinder block 2, a piston 3 that reciprocates within the cylinder block 2, a cylinder head 4 fixed on the cylinder block 2, a combustion chamber 5 formed between the piston 3 and the cylinder head 4, an intake valve 6, an intake port 7, an exhaust valve 8, and an exhaust port 9. As shown in FIG. 1, an ignition plug 10 is arranged at the central portion of the inner wall surface of the cylinder head 4. A fuel injection valve 11 is arranged in the peripheral portion of the inner wall surface of the cylinder head 4. Further, a cavity 12 that extends from below the fuel injection valve 11 to below the ignition plug 10 is formed on the top surface of the piston 3.

The intake port 7 of each cylinder is coupled to a surge tank 14 via a corresponding intake branch pipe 13. The surge tank 14 is coupled to an air cleaner (not shown) via an intake pipe 15. An airflow meter 16, and a throttle valve 18 that is driven by a step motor 17 are arranged, within the intake pipe 15. On the other hand, the exhaust port 9 of each cylinder is coupled to an exhaust manifold 19. The exhaust manifold 19 is coupled to a catalytic converter 21 having a three-way catalyst 20 built therein. The outlet of the catalytic converter 21 is coupled to an exhaust pipe 22. An air-fuel ratio sensor 23 is arranged within the exhaust manifold 19; that is, within the exhaust passage on the upstream side of the three-way catalyst 20. Also, an oxygen sensor 24 is arranged within the exhaust pipe 22, that is, within the exhaust passage on the downstream side of the three-way catalyst 20.

Figure 2:
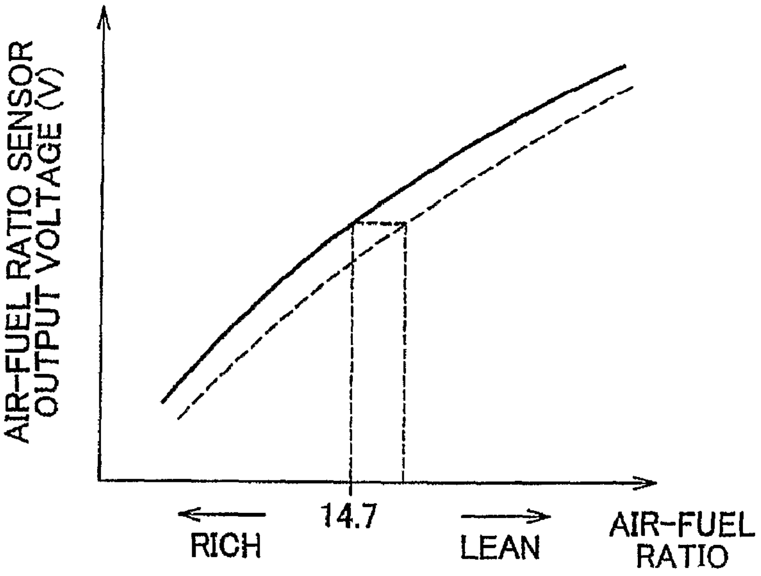
FIG. 2 is a diagram showing the relationship between the exhaust air-fuel ratio and the output voltage of an air-fuel ratio sensor.
Figure 3:
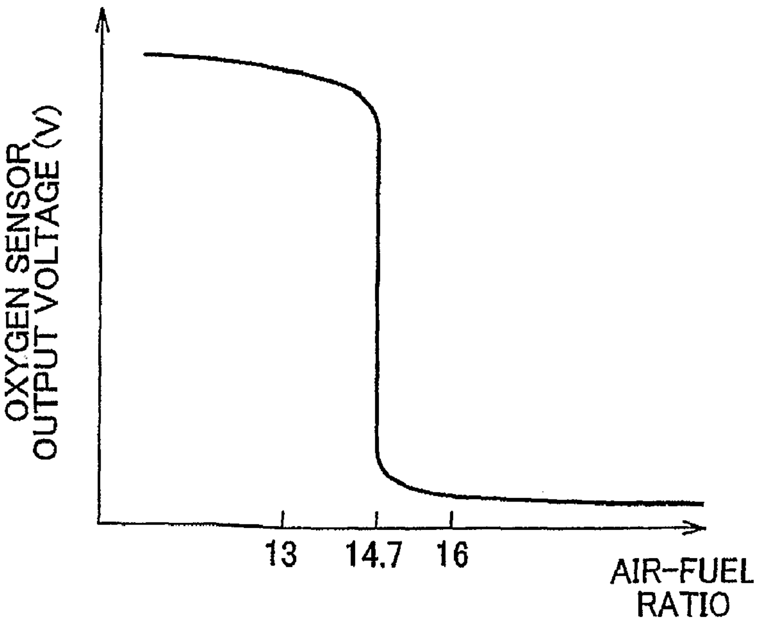
FIG. 3 is a diagram showing the relationship between the exhaust air-fuel ratio and the output voltage of an oxygen sensor.

An electronic control unit 31 is configured by a digital computer, and includes a RAM (Random Access Memory) 33, a ROM (Read-Only Memory) 34, a CPU (microprocessor) 35, an input port 36, and an output port 37, which are connected to each other via, a bi-directional bus 32. The airflow meter 16 generates an output voltage that is proportional to the intake-air flow rate. The output voltage is input to the input port 36 via a corresponding AD converters 38. As shown in FIG. 2, based on the oxygen concentration in the exhaust gas passing through the exhaust manifold 19, the air-fuel ratio sensor 23 generates an output voltage (output value) that is substantially proportional to the air-fuel ratio of the exhaust gas. On the other hand, as shown in FIG. 3, based on the oxygen concentration in exhaust gas that has passed through the three-way catalyst 20 and into the exhaust pipe 22, the oxygen sensor 24 generates an output voltage (output value) that varies greatly depending on whether the air-fuel ratio of the exhaust gas is richer or leaner than the theoretical air-fuel ratio (approximately 14.7). The output voltages are each input to the input port 36 via the corresponding AD converter 38. It should be noted that any air-fuel ratio sensor 23 and oxygen sensor 24 will suffice as far as they can detect the air-fuel ratio of exhaust gas, and in this sense, the air-fuel ratio sensor 23 and the oxygen sensor 24 may be both referred to as air/fuel sensors.

A load sensor 41 is connected to an accelerator pedal 40 for generating an output voltage proportional to the amount of depression on the accelerator pedal 40. The output voltage of the load sensor 41 is input to the input port 36 via the corresponding AD converter 38. A crank angle sensor 42 generates an output pulse every time a crankshaft rotates by, for example, 30 degrees. The output pulse is input to the input port 36. The CPU 35 calculates the engine speed from this output pulse of the crank angle sensor 42. The output port 37 is connected to the ignition plug 10, the fuel injection valve 11, and the step motor 17 via corresponding drive circuits 39.

The three-way catalyst 20 described above has an oxygen storage capacity. Hence, when the air-fuel ratio of exhaust gas flowing into the three-way catalyst 20 is lean, the three-way catalyst 20 stores oxygen contained in the exhaust gas, and when the air-fuel ratio of exhaust gas flowing into the three-way catalyst 20 is rich, the three-way catalyst 20 releases the stored oxygen to oxidize HC or CO contained in the exhaust gas for purification.

To make effective use of the oxygen storage capacity of the three-way catalyst 20, it is necessary to maintain the amount of oxygen stored within the three-way catalyst 20 at a prescribed amount (for example, half of the maximum oxygen storage amount) so that exhaust gas may be purified regardless of whether the air-fuel ratio of the exhaust gas becomes rich or lean thereafter. If the amount of oxygen stored in the three-way catalyst 20 is maintained at the prescribed amount, the three-way catalyst 20 can maintain some degree of oxygen storage and release actions. As a result, oxidation and reduction of components in exhaust gas can be always performed by the three-way catalyst 20. Thus, in this embodiment, in order to maintain the exhaust purification performance of the three-way catalyst 20, air-fuel ratio control is performed to keep the oxygen storage amount in the three-way catalyst constant.

Accordingly, in this embodiment, the exhaust air-fuel ratio (the ratio between air and fuel that are supplied to the exhaust passage on the upstream side of the three-way catalyst 20, the combustion chamber 5, and the intake passage) is detected by the air-fuel ratio sensor (upstream air-fuel ratio sensor) 23 provided upstream of the three-way catalyst 20. Also, feedback control is performed with respect to the amount of fuel supplied from the fuel injection valve 11 so that the output value of the air-fuel ratio sensor 23 corresponds to the theoretical air-fuel ratio (hereinafter, this feedback control is referred to as "main feedback control"). The exhaust air-fuel ratio is thus kept close to the theoretical air-fuel ratio and, as a result, the amount of oxygen stored in the three-way catalyst is kept constant, thereby achieving improved exhaust emissions.

Now, a specific description will be given of the main feedback control. First, in this embodiment, the amount of fuel that is supplied from the fuel injection valve 11 to each cylinder (hereinafter, referred to as "target fuel supply amount") is calculated using Equation (1) below.

$$Qft(n)=Mc(n)/AFT+DQf(n-1) \qquad (1)$$

In Equation (1), "n" represents the number of times the calculation is performed by the ECU 31. For example, Qft(n) represents the target fuel supply amount calculated by the n-th calculation. Mc(n) represents the amount of air that is expected to have been drawn into each cylinder by the time the intake valve 6 closes (hereinafter, referred to as "in-cylinder intake air amount"). The in-cylinder intake air amount Mc(n) is calculated as follows. That is a map or a calculation formula with, for example, the engine speed Ne and the amount of air that passes through the intake pipe 15 (hereinafter referred to as "intake pipe air flow amount") "mt" as arguments is obtained experimentally or by calculation in advance. The map or calculation formula is stored in the ROM 34 of the ECU 31. The in-cylinder intake air amount Mc(n) is calculated using the map or calculation formula based on the engine speed Ne and the intake pipe air flow amount "mt" detected during engine operation. AFT represents the target exhaust air-fuel ratio (target air-fuel ratio), which is the theoretical air-fuel ratio (14.7) in this embodiment. DQf represents the fuel correction amount calculated with respect to the main feedback control, described below. The fuel injection valve 11 injects an amount of fuel corresponding to the target fuel supply amount calculated in this way.

While the above description is directed to a case where the in-cylinder intake air amount Mc(n) is calculated using a map or the like with the engine speed Ne and the intake pipe air flow amount "mt" as arguments, alternatively, the in-cylinder intake air amount Mc(n) may be calculated through other methods, for example, by using a calculation formula based on the opening amount of the throttle valve 18 and the atmospheric pressure, etc.

Figure 4:
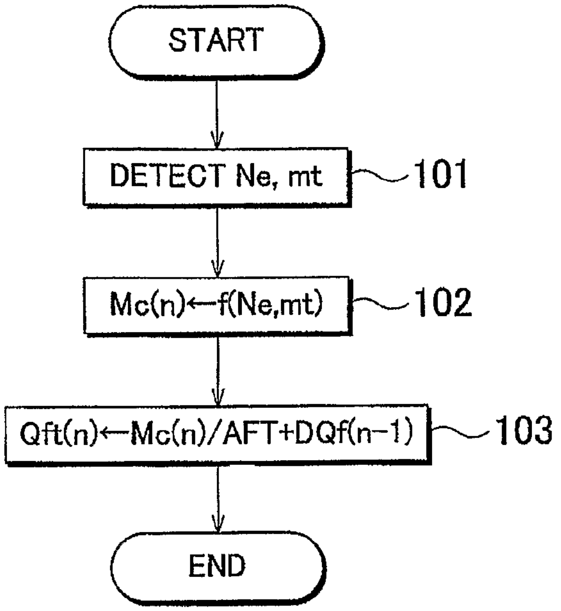
FIG. 4 is a flowchart showing the control routine of target fuel supply amount calculation control for calculating the target fuel supply.

FIG. 4 is a flowchart showing the control routine of a target fuel supply amount calculation control for calculating the target fuel supply amount Qft(n) to be supplied from the fuel injection valve 11. The control routine shown in the drawing is executed by interruption at predetermined time intervals.

In the target fuel supply amount calculation control, first, the engine speed Ne and the intake pipe air flow rate mt are detected by the crank angle sensor 42 and the airflow meter 16 in step 101. Then, in step 102, the in-cylinder intake air amount Mc(n) at time n is calculated using the map or calculation formula based on the engine speed Ne and the intake pipe air flow amount "mt" detected in step 101. Then, in step 103, the target fuel supply amount Qft(n) is calculated by Equation (1) above based on the in-cylinder intake air amount Mc(n) calculated in step 102 and the fuel correction amount DQf(n−1) at time n−1 calculated, by the main feedback control described later, and the control routine ends. The fuel injection valve 11 injects an amount of fuel equivalent to the calculated target fuel supply amount Qft(n).

Next, the main feedback control will be described. In this embodiment, PI control is performed as the main feedback control. According to the PI control, the air-fuel ratio deviation ΔOf between the actual exhaust fuel supply amount, calculated based on the output of the air-fuel ratio sensor 23, and the above-described target air-fuel ratio Qft is calculated at each calculation time, and a fuel correction amount DQf that brings the air-fuel ratio deviation ΔQf to zero is calculated. Specifically, in this embodiment, the fuel correction amount DQf is calculated using Equation (2) below. In Equation (2), Kmp and Kmi represent a proportional gain and an integral gain, respectively. Also, Kmp·ΔQf(n) and Kmi·ΣΔQf represent the proportional term and the integral term, respectively. The proportional gain Kmp and the integral gain Kmi may be predetermined constant values, or may be values that vary in accordance with the engine operating condition.

$$DQf(n) = Kmp \cdot \Delta Qf(n) + Kmi \cdot \sum_{k=1}^{n} \Delta Qf(k) \qquad (2)$$

While in this embodiment PI control is performed as the main feedback control, any kind of control, such as PID control, may be performed as long as the fuel correction amount DQf that brings the fuel deviation ΔQf to zero can be calculated.

Figure 5:
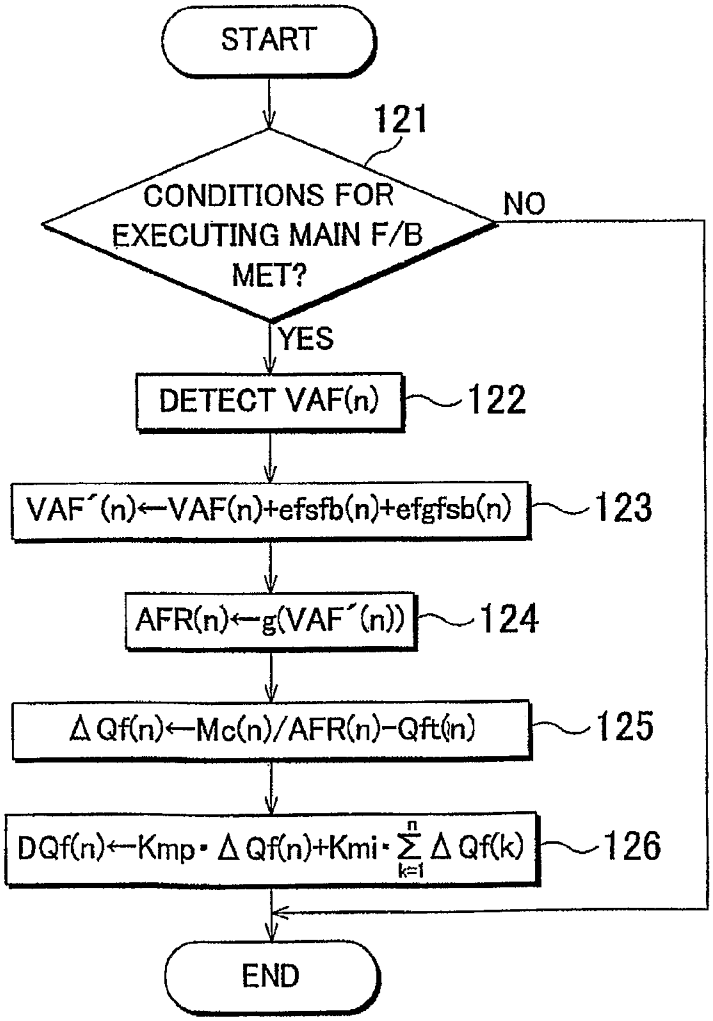
FIG. 5 is a flowchart showing the control routine of main feedback control for calculating the fuel correction amount.

FIG. 5 is a flowchart showing the control routine of the main feedback control for calculating the fuel correction amount DQf. The control routine shown in the drawing is executed by interruption at predetermined time intervals.

First, in step 121, it is determined whether the conditions for executing the main feedback control are met. Cases where the conditions for executing the main feedback control are determined to be met are, for example, when cold starting of the internal combustion engine is not performed (that is, engine coolant temperature is equal to or higher than a fixed temperature, and fuel increase control at startup or the like is not performed), when fuel cut-off control of stopping injection of fuel from the fuel injection valve during engine operation is not performed, and the like. If it is determined in step 121 that the conditions for executing the main feedback control are met, the process advances to step 122.

In step 122, the output value VAF(n) of the air-fuel ratio sensor 23 at the n-th calculation is detected. Then, in step 123, the output correction value efsfb(n) for the air-fuel ratio sensor 23 and a sub-feedback learned value efgfsb, which are calculated by the control routine of sub-feedback control described later, are added to the output value VAF(n) detected in step 122, thereby correcting the output value of the air-fuel ratio sensor 23 to calculate the corrected output value VAF'(n) in the n-th calculation (VAF'(n)=VAF(n)+efsfb(n)+efgfsb (n)).

Then, in step 124, the actual air-fuel ratio AFR(n) at time n is calculated using the map shown in FIG. 2 based on the corrected output value VAF'(n) calculated in step 123. Thus, calculated actual air-fuel ratio AFR(n) substantially coincides with the actual air-fuel ratio of exhaust gas flowing into the three-way catalyst 20 at the time of the n-th calculation.

Next, in step 125, the air-fuel ratio deviation ΔQf between the fuel supply amount, calculated based on the output of the air-fuel ratio sensor 23, and the target fuel supply amount Qft is calculated using Equation (3) below. It should be noted that in Equation (3), values at the n-th calculation are used for the in-cylinder intake air amount Mc and the target fuel supply amount Oft, values at a time preceding the n-th calculation may be used as well.

$$\Delta Qf(n) = Mc(n)/AFR(n) - Qft(n) \qquad (3)$$

In step 126, the fuel correction amount DQf(n) at time n is calculated by Equation (2) mentioned above, and the control routine ends. The calculated fuel correction amount DQf(n) is used in step 103 of the control routine shown in FIG. 4. On the other hand, if it is determined in step 121 that the conditions for executing the main feedback control are not met, the control routine is ended without updating the fuel, correction amount DQf(n).

An error may occur in the output of the air-fuel ratio sensor 23 due to, for example, degradation of the air-fuel ratio sensor 23 caused by the heat of exhaust gas. In such cases, the air-fuel ratio sensor 23 that would normally produce output values as indicated by the solid line in FIG. 2 may instead produce output values as indicated by the broken line in FIG. 2, for example. If such error occurs in the output value of the air-fuel ratio sensor 23, the air-fuel ratio sensor 23 produces an output value that would normally be produced only when the exhaust air-fuel ratio is stoichiometric, when the exhaust air-fuel ratio is leaner than stoichiometric. Accordingly, in this embodiment, such an error in the output value of the air-fuel ratio sensor 23 is compensated for by the sub-feedback control using the oxygen sensor (downstream air-fuel ratio sensor) 24 so that the output value of the air-fuel ratio sensor 23 corresponds to the actual exhaust air-fuel ratio.

That is, as shown in FIG. 3, the oxygen sensor 24 detects whether the exhaust air-fuel ratio is richer or leaner than stoichiometric, with little error in the determination of whether the exhaust air-fuel ratio is richer or leaner than stoichiometric. Hence, the output voltage of the oxygen sensor 24 is low when the actual exhaust air-fuel ratio is lean, and the output voltage of the oxygen sensor 24 is high when the actual exhaust air-fuel ratio is rich. Therefore, when the actual exhaust air-fuel ratio is substantially stoichiometric, that is, repeatedly fluctuates near the stoichiometric air-fuel ratio, the output value of the oxygen sensor 24 repeatedly flips between a higher value and a lower value. In view of this, in this embodiment, the output value of the air-fuel ratio sensor 23 is corrected so that the output value of the oxygen sensor 24 repeatedly flips between a higher value and a lower value.

Figure 6:
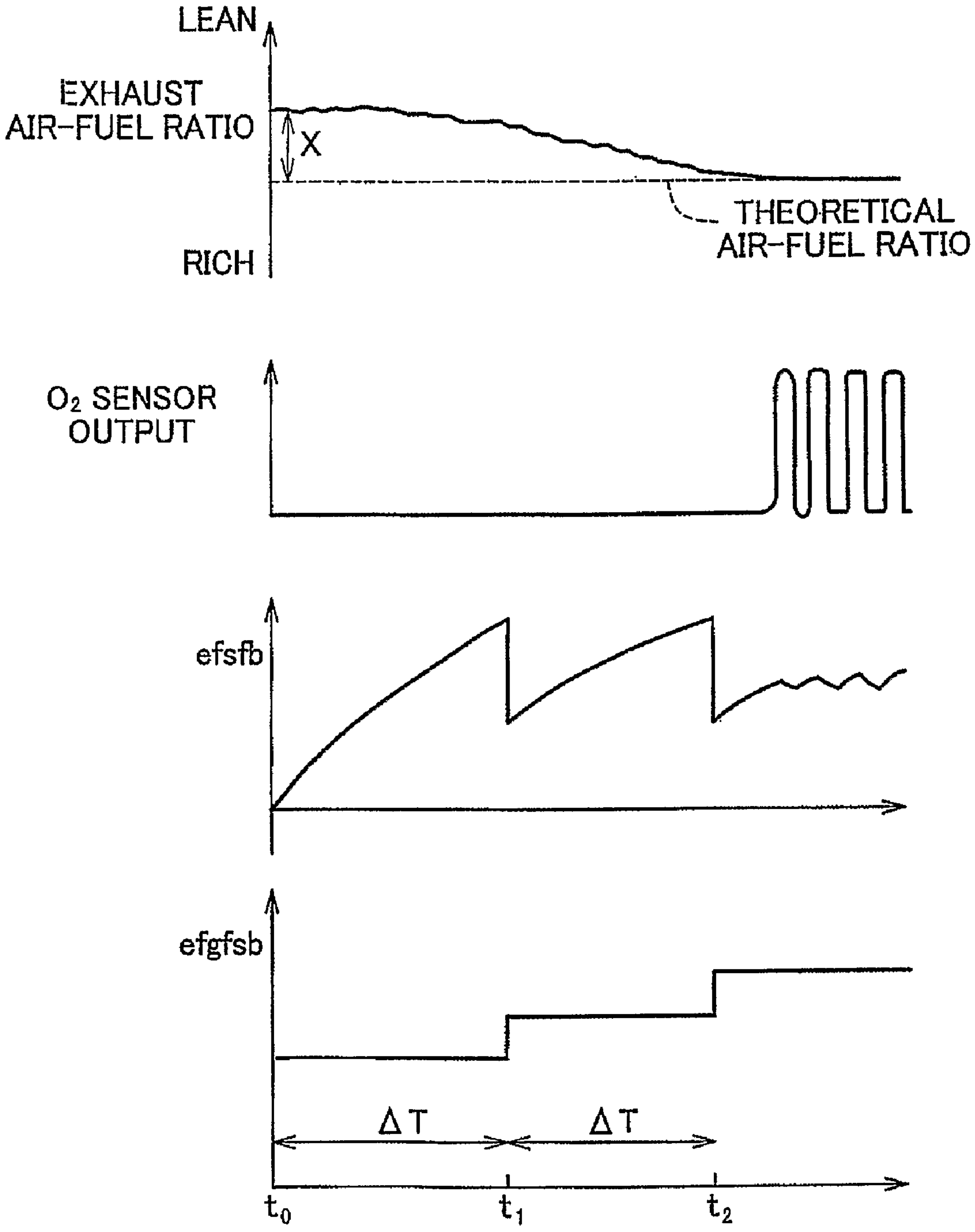
FIG. 6 is a time chart showing the exhaust air-fuel ratio, the output value of an oxygen sensor, the output correction value for an air-fuel ratio sensor, and the sub-feedback learned value.

FIG. 6 is a time chart showing the actual exhaust air-fuel ratio, the output value of the oxygen sensor, the output correction value efsfb for the air-fuel ratio sensor 23, and the sub-feedback learned value efgfsb. As illustrated in the time chart of FIG. 6, when an error occurs in the air-fuel ratio sensor 23, and the actual exhaust air-fuel ratio is not stoichiometric, even though a control is executed to bring the actual exhaust air-fuel ratio to theoretical, the error in the air-fuel ratio sensor 23 is compensated for over time.

In the example shown in FIG. 6, at time t0, the actual exhaust air-fuel ratio is not stoichiometric but leaner than stoichiometric. This is because, due to an error in the air-fuel ratio sensor 23, an output value corresponding to the theoretical air-fuel ratio is output by the air-fuel ratio sensor 23 when the actual exhaust air-fuel ratio is leaner than stoichiometric. At this time, the output value of the oxygen sensor 24 is low.

As described above, in step 123 of FIG. 5, the output correction value efsfb for the air-fuel ratio sensor 23 is added to the output value VAF(n) to calculate the corrected output value VAF'(n). Thus, the output value of the air-fuel ratio sensor 23 is corrected to the leaner side when the output correction value efsfb is positive, and the output value of the air-fuel ratio sensor 23 is corrected to the richer side when the output correction value efsfb is negative. The greater the absolute value of the output correction value efsfb, the greater the correction of the output value of the air-fuel ratio sensor 23 will be.

If the oxygen sensor 24 outputs a low value even though the output value of the air-fuel ratio sensor 23 substantially indicates the stoichiometric air-fuel ratio, this means that the output value of the air-fuel ratio sensor 23 is shifted to the richer side. Accordingly, in this embodiment, when the oxygen sensor 24 outputs a low value, the output correction value efsfb is increased to correct the output value of the air-fuel ratio sensor 23 to the leaner side. On the other hand, if the oxygen sensor 24 outputs a high value even though the output value of the air-fuel ratio sensor 23 substantially indicates the stoichiometric air-fuel ratio, the output correction value efsfb is decreased to correct the output value of the air-fuel ratio sensor 23 to the richer side.

Specifically, the output correction value efsfb is calculated using Equation (4) below. In Equation (4), ΔVO(n) represents an output deviation between the output value of the oxygen sensor 24 in the n-th calculation and the target output value (in this embodiment, a value corresponding to the theoretical air-fuel ratio). Ksp and Ksi represent a proportional gain and an integral gain, respectively. Ksp·ΔVO(n) and Ksi·ΣΔVO represent the proportional term and the integral term, respectively. The proportional gain Ksp and the integral gain Ksi may be predetermined constant values, or may be values that vary in accordance with the engine operating condition.

$$efsfb(n) = Ksp \cdot \Delta VO(n) + Ksi \cdot \sum_{k=1}^{n} \Delta VO(k) \tag{4}$$

While PI control is performed as the sub-feedback control in this embodiment, any kind of control; such as PID control, may be performed as far as integral control is included.

As described above, in the example shown in FIG. 6, as the value of the output correction value efsfb for the air-fuel ratio sensor 23 increases, the error in the output value of the air-fuel ratio sensor 23 is corrected so that the actual exhaust air-fuel ratio gradually approaches theoretical air fuel ratio.

The output value of the air-fuel ratio sensor 23 is corrected as appropriate by the sub-feedback control in this way. At this time, in cases such as when the internal combustion engine is stopped or when fuel cut-off control is performed, for example, the sub-feedback control is interrupted and, as a result, the output correction value efsfb is reset to zero. In cases such as when the internal combustion engine is started again or the fuel cut-off control is finished thereafter, the sub-feedback control resumes. However, because the output correction value efsfb is reset to zero, it takes a while for correcting the output value of the air-fuel ratio sensor 23 to an appropriate value again.

Accordingly, in this embodiment, a sub-feedback learned value efgfsb, which corresponds to a steady-state error between the output value of the air-fuel ratio sensor 23 and the actual exhaust air-fuel ratio, is calculated based on the value of the integral term of the output correction value efsfb in the above-described sub-feedback control. Also, as shown in step 123 of FIG. 5, the output value VAF of the air-fuel ratio sensor 23 is corrected in accordance with the calculated sub-feedback learned value efgfsb (hereinafter, the control will be referred to as the "learning control"). The sub-feedback learned value efgfsb is not reset, to zero even when, for example, the internal combustion engine stops. Therefore, even after the internal combustion engine is stopped, the output value of the air-fuel ratio sensor 23 may be corrected to an appropriate value again relatively quickly by the sub-feedback control.

Specifically, the sub-feedback learned value efgfsb increases if the output correction value efsfb after a predetermined period of time ΔT has elapsed since the previous learning (that is, the time when the sub-feedback learned value efgfsb was calculated) is positive, and the sub-feedback learned value efgfsb decreases if the output correction value efsfb is negative. The amount of increase or decrease in the sub-feedback learned value efgfsb increases as the absolute value of the output correction value efsfb increases.

In particular, in this embodiment, the output correction value efsfb and the sub-feedback learned value efgfsb are updated when the predetermined period of time ΔT has elapsed using Equations (5) and (6) below, respectively. It should be noted that in Equations (5) and (6) below, α represents a moderating ratio, which is a predetermined positive value not larger than 1 ($0\alpha \leqq 1$). Accordingly, because the output correction value efsfb is positive at time t1 in the example shown in FIG. 6; the output correction value efsfb is decreased on the basis of Equation (5) and (6) below and also the sub-feedback learned value efgfsb is increased. Likewise, because the output correction value efsfb is also positive at time t2, the output correction value efsfb is decreased using Equation (5) and (6) below and also the sub-feedback learned value efgfsb is increased.

$$efsfb = efsfb - Msi \cdot \alpha \quad (5)$$

$$efgfsb = efgfsb + Msi \cdot \alpha \quad (6)$$

As described above, the sub-feedback learned value efgfsb and the output correction value efsfb for the air-fuel ratio sensor 23 calculated in this way are added to the output value VAF(n) to calculate the corrected output value VAF'(n) in step 123 of FIG. 5. The sub-feedback learned value efgfsb is not reset when the internal combustion engine is stopped, for example. Thus, even if the output correction value efsfb has been reset to zero when engine operation resumes after being stopped, the output value of the air-fuel ratio sensor 23 is quickly corrected to an appropriate value.

Depending on the engine operating condition, there are cases where the air-fuel ratio of a mixture supplied to the combustion chamber is controlled to a value other than the target air-fuel ratio, that is, the fuel supply amount is increased or decreased regardless of the target air-fuel ratio. Examples of such cases include fuel increase control, which is performed to increase the temperature of the engine 1 and the three-way catalyst 20 at cold start of the internal combustion engine, fuel decrease control or fuel cut-off control, which is performed when decelerating the internal combustion engine, fuel increase control which is performed to lower the temperature of the three-way catalyst when the temperature of the three-way catalyst 20 is too high, and fuel increase control which is performed to increase the output of the internal combustion engine when the engine load is high.

During the fuel supply amount increase or decrease control (hereinafter, referred to as "fuel increase or decrease control"), the air-fuel ratio of a mixture supplied to the combustion chamber 5 is not controlled to the target air-fuel ratio. Therefore, if the sub-feedback control or learning control is executed based on the exhaust air-fuel ratio at this time, it is impossible to appropriately compensate for the output value of the air-fuel ratio sensor 23. Accordingly, it is proposed to interrupt the sub-feedback control or the learning control during execution of fuel increase or decrease control, and to resume the sub-feedback control or the learning control again after the fuel increase or decrease control is completed.

However, it frequently happens that even through the air-fuel ratio of a mixture supplied to the combustion chamber 5 is controlled to stoichiometric by the main feedback control after fuel increase or decrease control is finished, the air-fuel ratio of exhaust gas discharged from the three-way catalyst 20 is not stoichiometric immediately after the fuel increase or decrease control ends. That is, unburned fuel or the like adheres to the three-way catalyst 20 during execution of the fuel increase control, and oxygen is stored into the three-way catalyst 20 during execution of the fuel decrease control. Hence, even if the air-fuel ratio of exhaust gas flowing into the three-way catalyst 20 is stoichiometric, the air-fuel ratio of exhaust gas discharged from the three-way catalyst 20 differs from the stoichiometric air-fuel ratio because the exhaust gas discharged from the three-way catalyst 20 contains unburned fuel or oxygen in the three-way catalyst 20. Thus, the air-fuel ratio of the mixture supplied to the combustion chamber 5 cannot be accurately detected by the oxygen sensor 24 arranged on the exhaust downstream side of the three-way catalyst 20.

Accordingly, in this embodiment, integration of the value of the integral term in the above-mentioned sub-feedback control is stopped until the atmosphere within the three-way catalyst 20 becomes appropriate after fuel increase or decrease control ends, that is, until any excess unburned fuel or excess oxygen is gone and the air-fuel ratio becomes substantially stoichiometric.

Figure 7:
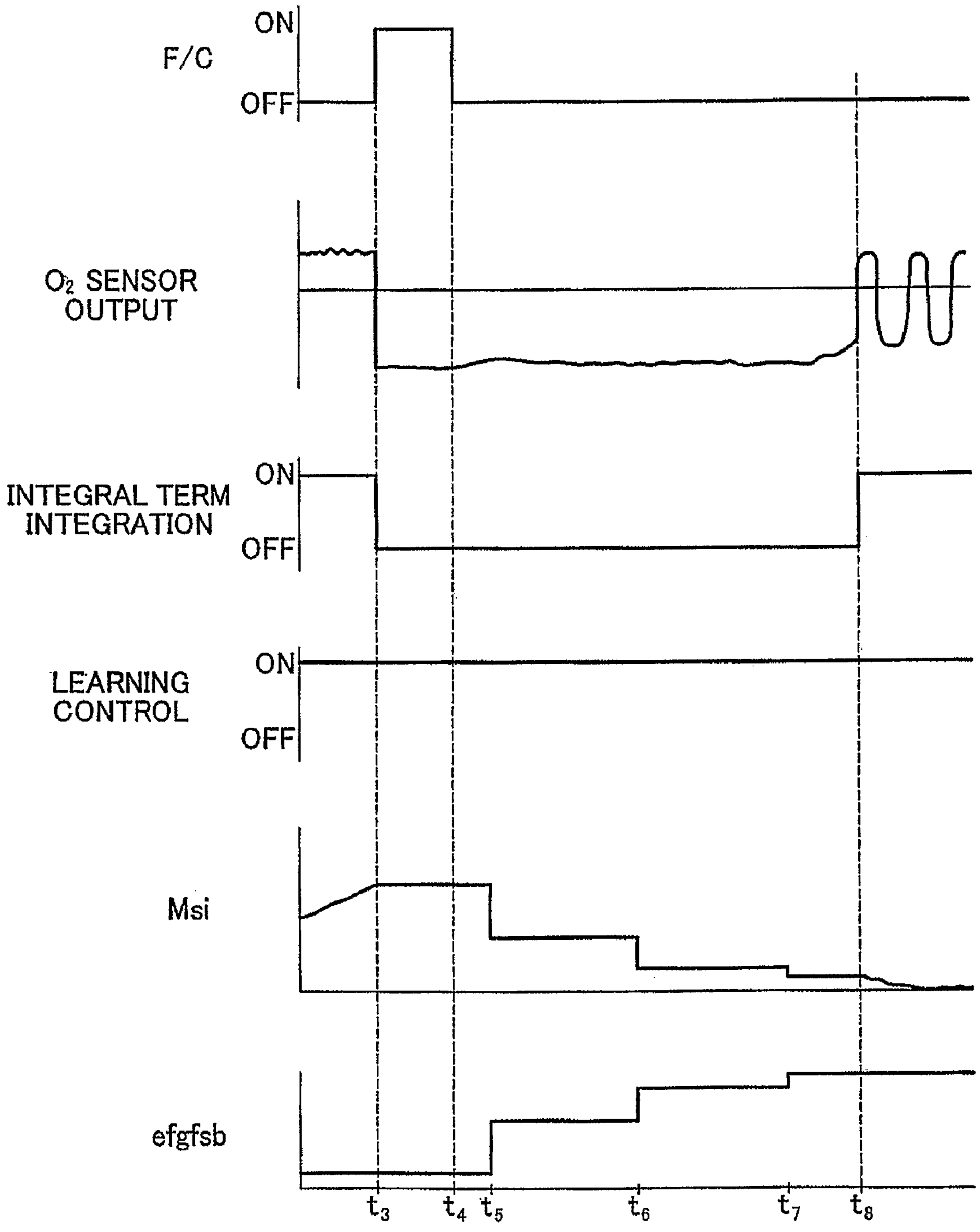
FIG. 7 is a time chart showing various parameters when fuel cut-off control is executed.

FIG. 7 is a time chart illustrating the execution or non-execution of fuel cut-off control at the time of fuel cut-off control, the output value of the oxygen sensor 24, the execution or non-execution of integration of the integral term in the sub feedback control, the execution or non-execution of learning control, the value of the integral term in the sub-feedback control, and the sub-feedback learned value.

In the example shown in FIG. 7, fuel cut-off control is started at time t3. Before the start of the fuel cut-off control, the output value of the oxygen sensor 24 is high, indicating that the air-fuel ratio of exhaust gas flowing out of the three-way catalyst 20 is richer than stoichiometric. When the fuel cut-off control starts, the output value of the oxygen sensor 24 abruptly drops to a low value indicating that the air-fuel ratio of exhaust gas flowing out of the three-way catalyst 20 is significantly leaner than stoichiometric. Also, integration of the value of the integral term in the sub-feedback control is stopped simultaneously with the start of the fuel cut-off control. The value of the integral term in the sub-feedback control thus becomes constant after the start of the fuel cut-off control. On the other hand, in this embodiment, learning control is not stopped even after the fuel cut-off control is started (see the solid line in FIG. 7).

Then, at time t4, the fuel cut-off control is ended. Even after the fuel cut-off control ends, the output value of the oxygen sensor 24 remains low due to a large amount of oxygen stored within the three-way catalyst 20. In this embodiment, integration of the value of the integral term in the sub-feedback control is not performed even after the fuel cut-off control ends. On the other hand, the learning control continues to be executed.

Because the learning control continues to be executed both during the fuel cut-off control and after the end of the fuel cut-off control, part of the value of the integral term is incorporated into the sub-feedback learned value based on Equations (5) and (6), even during the above-described period. In the example shown in FIG. 7, during the fuel cut-off control and after the end of the fuel cut-off control, first, incorporation of the value of the integral term is performed at time t5 after the elapse of predetermined time ΔT from the last incorporation of the value of the integral term. Thereafter, incorporation of the value of the integral term is performed at time t6 after the elapse of predetermined time ΔT from time t5, and at time t7 after the elapse of predetermined time ΔT from time t6.

Thereafter, when the output of the oxygen sensor 24 flips froth it low value to a high value at time t8, that is, when the air-fuel ratio of exhaust gas passing through the oxygen sensor 24 changes from lean to rich, it is regarded that excess oxygen, contained in the three-way catalyst 20 is removed, so the integration of the value of the integral term in the sub-feedback control is resumed.

That is, in this embodiment, during a period from the start of the fuel cut-off Control until the output value of the oxygen sensor 24 flips, only the integration of the value of the integral term in the sub-feedback control is stopped, and incorporation of the value of the integral term into the sub-feedback learned value or the like is continued. In other words, according to this embodiment if oxygen is stored in the three-way catalyst 20 due to the fuel cut-off control and hence the air-fuel ratio of exhaust gas discharged, from the three-way catalyst 20 becomes different from the air-fuel ratio of a mixture supplied into the combustion chamber 5, that is, if the oxygen sensor 24 cannot accurately detect the air-fuel ratio of the mixture supplied into the combustion chamber 5, the integration of the value of the integral term in the sub-feedback control is stopped. Thus, the integral term in the sub-feedback control will not be updated based on an inappropriate output of the oxygen sensor 24. Therefore, an appropriate value of the integral term in the sub-feedback control is maintained even when the fuel cut-off control is executed. At the same time, an appropriate sub-feedback learned value is also maintained. In particular, because the value of the integral term is incorporated into the sub-feedback learned value during the fuel cut-off control and also within a fixed period after the end of the fuel cut-off control, the sub-feedback learned value may be updated in an appropriate manner within this period.

In this embodiment, when the integration of the value of the integral term in the sub-feedback control is suspended, the value of the proportional term is made larger than that when the integration of the value of the integral term is not being stopped. Specifically, during the fuel cut-off control or for a fixed period after the end of the fuel cut-off control, the value of the proportional term is increased by increasing the proportional gain Ksp, or by multiplying the value of the proportional term in Equation (4) by a correction factor β that is equal to or greater than 1.

In some cases, the responsiveness of the output correction value in the sub-feedback control may deteriorate when the integration of the value of the integral term is stopped. In particular, when the above-described fixed period is set based on the flipping of the output value from the oxygen sensor 24 as described above, that is, when the period for which the integration of the value of the integral term is stopped is set based on the flipping of this output value, there may be cases where the output value of the oxygen sensor 24 is not flipped by the proportional control alone.

In contrast, by increasing the value of the proportional term when the integration of the value of the integral term is stopped, as in this embodiment, the response speed of the sub-feedback control may be maintained. Further, when the amount of oxygen stored in the three-way catalyst 20 decreases, the output value from the oxygen sensor 24 flips, thus making it possible to resume the integration of the value of the integral term in an appropriate manner.

In the above-mentioned embodiment, incorporation of the value of the integral term into the sub-feedback learned value is performed both during execution of the fuel cut-off control and for a fixed period after the end of the fuel cut-off control. However, incorporation of the value of the integral term into the sub-feedback learned value may be stopped in this period. In this case, the sub-feedback learned value is not updated during this period. Thus, in cases such as when an error may occur in the value of the integral term immediately before the start of the fuel cut-off control, it is possible to prevent the sub-feedback learned value from being updated in an appropriate manlier.

In the above-described embodiment, the condition for resuming the integration of the value of the integral term is that the output value of the oxygen sensor 24 is flipped once. However, the condition is not limited to the flipping of the output value of the oxygen sensor 24 once, but may also be that the output value is flipped a plurality of times. Further, such a condition is not limited to one based on the number of times the oxygen sensor 24 flips its value, but may be any condition that makes the atmosphere within the three-way catalyst 20 appropriate. For example, the condition may be set based on the time elapsed after the end of the fuel cut-off control or the like.

Figure 8:
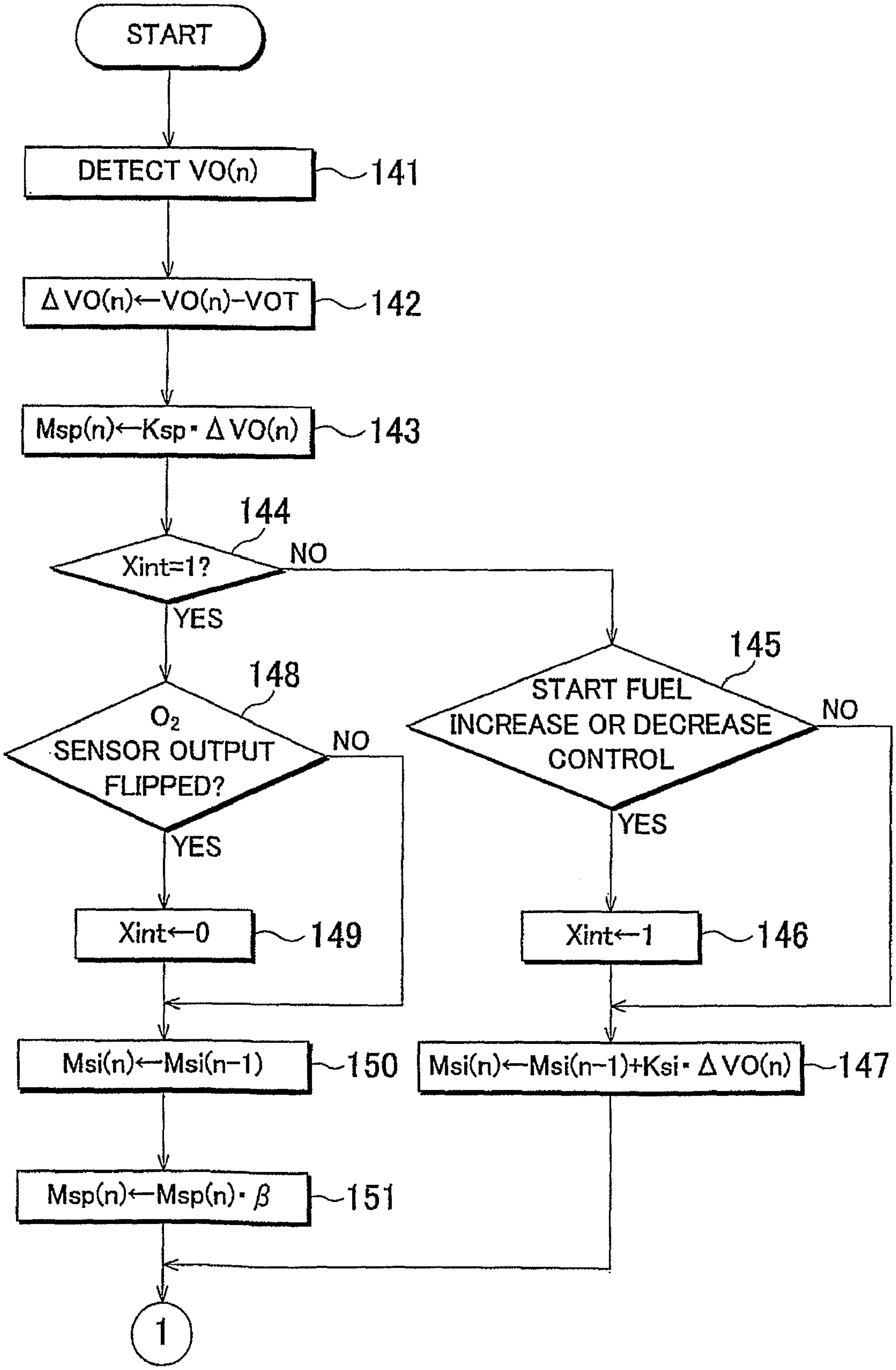
FIG. 8 is a part of a flowchart showing the control routine of sub-feedback control for calculating the output correction value.
Figure 9:
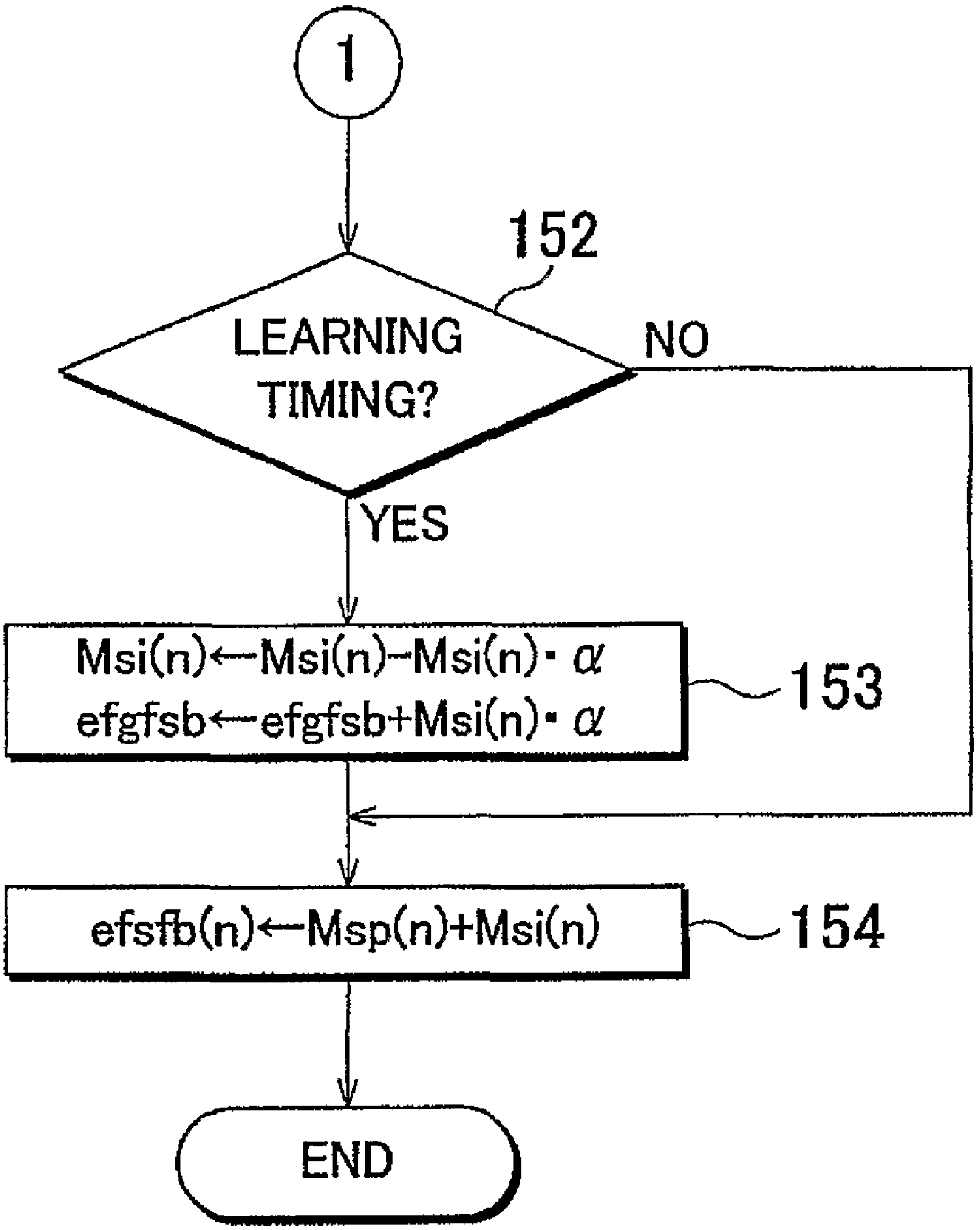
FIG. 9 is a part of a flowchart showing the control routine of sub-feedback control for calculating the output correction value.

FIGS. 8 and 9 are flowcharts showing the control routine of the sub-feedback control for calculating the output correction value efsfb. The control routine shown in the drawings is executed by interruption at predetermined time intervals.

First, in step 141, the output value VO(n) of the oxygen sensor 24 at time n is detected. Then, in step 142, the output deviation ΔVO(n) between the output value VO(n) of the oxygen sensor 24 detected in step 141 and the target output value VOT is calculated (ΔVO(n)←VO(n)−VOT). In step 143, the value of the proportional term Msp(n) at time n is calculated using Equation (7) below.

$$Msp(n)=Ksp\cdot\Delta VO(n) \qquad (7)$$

Then, in step 144, it is determined whether an integral flag Xint is "1". The integral flag Xint is set to 0 during integration of the value Msi of the integral term, and otherwise set to 1. Therefore, in step 144, it is determined whether the integration of the value Msi of the integral term is currently being stopped. If it is determined in step 144 that the integration of the value Msi of the integral term is not currently stopped (Xint=0), the process advance to step 145. In step 145, it is determined whether a fuel increase or decrease control has been started. If it is determined that a fuel increase or decrease control has been started, the process advances to step 146. In step 146, the integral flag Xint is set to 1, and the process advances to step 147. If it is determined that a fuel increase or decrease control has not been started, step 146 is skipped.

In step 147, the value Msi(n) of the integral term at time n is calculated using Equation (8) below. That is, integration of the value of the integral term is performed as normal in step 147. Thereafter, the process advances to step 152.

$$Msi(n)=Msi(n-1)+Ksi\cdot VO(n) \qquad (8)$$

On the other hand, if it is determined in step 144 that integration of the value Msi of the integral term is currently stopped (Xint=1), the process advances to step 148. In step 148, it is determined whether the output of the oxygen sensor 24 has changed from a value indicative of a lean condition to a value indicative of a rich condition or vice versa, that is, whether the output of the oxygen sensor 24 has flipped. If it is determined that the output of the oxygen sensor 24 has flipped, the process advances to step 149, where the integral flag Xint is reset to 0. Thereafter, the process advances to step 150. On the other hand, if it is determined in step 148 that the output of the oxygen sensor 24 has not flipped, step 149 is skipped. In step 150, the value Msi(n) of the integral term at time n is set as the value Msi(n−1) of the integral term at time n−1. That is, integration of the value Msi of the integral term is not performed in step 150. Then, in step 151, the value Msp(n) of the proportional term calculated in step 143 multiplied by a factor β (larger than 1) is set as the value of the proportional term (Msp(n)=Msp(n)·β). Then, the process advances to step 152.

In step 152, it is determined whether the current timing is the learning timing, that is, whether the above-mentioned predetermined time ΔT has elapsed since the last learning timing. If it is determined that the current timing is the learning timing, the process advances to step 153. In step 153, using Equations (5) and (6) mentioned above, the value Msi (n) of the integral term is decreased or increased by a predetermined amount, and the sub-feedback learned value efgfsb is increased or decreased by the predetermined amount, and the process advances to step 154. On the other hand, if it is determined in step 152 that the current timing is not the learning timing, step 153 is skipped.

Then, in step 154, the output correction amount efsfb(n) is calculated using Equation (9) below, and the control routine ends.

$$efsfb(n)=Msp(n)+Msi(n) \quad (9)$$

Although the output value of the sensor is corrected in the above-described embodiment, the fuel injection amount may be corrected instead. In addition, the PI control is performed in the above-mentioned embodiment, any control suffices as long as integral control is included.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. An air-fuel ratio control method for an internal combustion engine that includes: an upstream air-fuel ratio sensor that is arranged on an exhaust upstream side of an exhaust purification catalyst provided within an engine exhaust passage and detects an air-fuel ratio of exhaust gas; and a downstream air-fuel ratio sensor that is arranged on an exhaust downstream side of the exhaust purification catalyst and detects an air-fuel ratio of exhaust gas, the air-fuel ratio control method comprising:

executing a main feedback control that controls a fuel supply amount on the basis of an output value of the upstream air-fuel ratio sensor so that an exhaust air-fuel ratio becomes a target air-fuel ratio; and executing a sub-feedback control that compensates for an error between the output value of the upstream air-fuel ratio sensor and an actual exhaust air-fuel ratio by correcting the fuel supply amount on the basis of an output value of the downstream air-fuel ratio sensor so that the exhaust air-fuel ratio becomes the target air-fuel ratio, wherein when executing the sub-feedback control, a correction amount for the fuel supply amount is calculated on the basis of a value of an integral term that integrates a deviation between the output value of the downstream air-fuel ratio sensor and the target air-fuel ratio; and when a fuel increase or decrease control that increases or decreases the fuel supply amount irrespective of the target air-fuel ratio is executed, updating of the value of the integral term in the sub-feedback control is stopped for a predetermined period after completion of the fuel increase or decrease control; the method further comprising:

calculating a learned value, which corresponds to a steady-state error between the output value of the upstream air-fuel ratio sensor and the actual exhaust air-fuel ratio, based on the integral term, and correcting the fuel supply amount based on the calculated learned value; and calculating the learned valued even during the predetermined period after completion of the fuel increase or decrease control.

2. An air-fuel ratio control device for an internal combustion engine comprising:

an upstream air-fuel ratio sensor that is arranged on an exhaust upstream side of an exhaust purification catalyst provided within an engine exhaust passage and detects an air-fuel ratio of exhaust gas;

a downstream air-fuel ratio sensor that is arranged on an exhaust downstream side of the exhaust purification catalyst and detects an air-fuel ratio of exhaust gas; and a controller that executes a main feedback control that controls a fuel supply amount on the basis of an output value of the upstream air-fuel ratio sensor so that an exhaust air-fuel ratio becomes a target air-fuel ratio, and a sub-feedback control that compensates for an error between the output value of the upstream air-fuel ratio sensor and an actual exhaust air-fuel ratio by correcting the fuel supply amount on the basis of an output value of the downstream air-fuel ratio sensor so that the exhaust air-fuel ratio becomes the target air-fuel ratio, wherein the controller calculates a correction amount for the fuel supply amount in the sub-feedback control on the basis of a value of an integral term that integrates a deviation between the output value of the downstream air-fuel ratio sensor and the target air-fuel ratio, and when a fuel increase or decrease control that increases or decreases the fuel supply amount irrespective of the target air-fuel ratio is executed, the controller stops updating of the value of the integral term in the sub-feedback control for a predetermined period after completion of the fuel increase or decrease control; the device further comprising:

a learning portion for calculating a learned value, which corresponds to a steady-state error between the output value of the upstream air-fuel ratio sensor and the actual exhaust air-fuel ratio, based on the integral term, and correcting the fuel supply amount based on the calculated learned value, wherein the learning portion calculates the learned valued even during the predetermined period after completion of the fuel increase or decrease control.

3. The air-fuel ratio control device for an internal combustion engine according to claim 2, wherein:

the correction value for the fuel supply amount in the sub-feedback control is calculated based on a value of a proportional term that multiplies the deviation between the output value of the downstream air-fuel ratio sensor and the target air-fuel ratio by a proportional gain, in addition to the value of the integral term; and the value of the proportional term is made larger during the predetermined period after completion of the fuel increase or decrease control than in a period other than the predetermined period.

4. The air-fuel ratio control device for an internal combustion engine according to claim 2, wherein the predetermined period is a period from completion of the fuel increase or decrease control until an air-fuel ratio of exhaust gas discharged from the exhaust purification catalyst becomes close to the target air-fuel ratio.

5. The air-fuel ratio control device for an internal combustion engine according to claim 2, wherein the downstream air-fuel ratio sensor is an oxygen sensor that generates an output voltage that varies greatly depending on whether the air-fuel ratio of the exhaust gas is richer or leaner than the theoretical air-fuel ratio.

6. The air-fuel ratio control device for an internal combustion engine according to claim 4, wherein the predetermined period is a period from completion of the fuel increase or decrease control until an output voltage of the oxygen sensor flips.

* * * * *